США007593931B2

(12) United States Patent
Zuzarte et al.

(10) Patent No.: US 7,593,931 B2
(45) Date of Patent: Sep. 22, 2009

(54) APPARATUS, SYSTEM, AND METHOD FOR PERFORMING FAST APPROXIMATE COMPUTATION OF STATISTICS ON QUERY EXPRESSIONS

(75) Inventors: Calisto Paul Zuzarte, Pickering (CA); Xiaohui Yu, Maple (CA)

(73) Assignee: International Business Machines Corporation, Armonk, NY (US)

( * ) Notice: Subject to any disclaimer, the term of this patent is extended or adjusted under 35 U.S.C. 154(b) by 279 days.

(21) Appl. No.: 11/622,748

(22) Filed: Jan. 12, 2007

(65) Prior Publication Data

US 2008/0172354 A1   Jul. 17, 2008

(51) Int. Cl.
*G06F 17/30* (2006.01)
(52) U.S. Cl. .......................................... 707/4
(58) Field of Classification Search .................. None
See application file for complete search history.

(56) References Cited

U.S. PATENT DOCUMENTS

| 5,848,408 | A | * | 12/1998 | Jakobsson et al. ............... 707/3 |
| 6,105,020 | A | * | 8/2000 | Lindsay et al. .................. 707/2 |
| 6,477,534 | B1 | | 11/2002 | Acharya et al. |
| 6,708,185 | B2 | | 3/2004 | Harris |
| 6,732,093 | B2 | | 5/2004 | Vally et al. |
| 6,971,091 | B1 | | 11/2005 | Arnold et al. |
| 7,020,797 | B2 | | 3/2006 | Patil |
| 7,191,169 | B1 | * | 3/2007 | Tao ............................... 707/2 |
| 2002/0161753 | A1 | | 10/2002 | Inaba et al. |
| 2003/0041042 | A1 | | 2/2003 | Cohen et al. |
| 2003/0088541 | A1 | * | 5/2003 | Zilio et al. ...................... 707/1 |
| 2003/0088565 | A1 | | 5/2003 | Walter et al. |
| 2003/0158846 | A1 | | 8/2003 | Ikehata et al. |
| 2003/0182276 | A1 | * | 9/2003 | Bossman et al. ................ 707/3 |
| 2004/0030667 | A1 | | 2/2004 | Xu et al. |
| 2004/0162768 | A1 | | 8/2004 | Snyder et al. |
| 2004/0236762 | A1 | | 11/2004 | Chaudhuri et al. |
| 2005/0050041 | A1 | | 3/2005 | Galindo-Legaria et al. |
| 2005/0149505 | A1 | * | 7/2005 | Bossman et al. ................ 707/3 |
| 2007/0220058 | A1 | | 9/2007 | Kandil et al. |

OTHER PUBLICATIONS

Patent Cooperative Treaty, International Search Report, International Patent Application No. CA2007/000404, International file date Mar. 14, 2007, Applicant—International Business Machines Corporation, et al, 3 pages.
Bruno et al., "Conditional Selectivity for Statistics on Query Expression", 12 pages, Jun. 2004.

* cited by examiner

*Primary Examiner*—Charles Rones
*Assistant Examiner*—Yuk Ting Choi
(74) *Attorney, Agent, or Firm*—Kunzler & McKenzie

(57) ABSTRACT

An apparatus, system, and method are disclosed for performing fast approximate computation of statistics on query expressions in order to improve query optimization within a database management system by accurately and quickly estimating the sizes of intermediate query results. This is accomplished by analyzing a query for join instruction and identifying a fact table and a dimension table within those join instructions. Then, frequency statistics corresponding to distinct values of within the fact table are retrieved from a catalog table. Those frequency statistics are used in combination with a full scan of the dimension table accurately and quickly estimate frequency statistics for an expected join between the fact table and dimension table. The estimated frequency statistics corresponding to the expected join may then be used in such operations as query optimization.

6 Claims, 2 Drawing Sheets

APPARATUS, SYSTEM, AND METHOD FOR PERFORMING FAST APPROXIMATE COMPUTATION OF STATISTICS ON QUERY EXPRESSIONS

BACKGROUND OF THE INVENTION

1. Field of the Invention

This invention relates to database query optimization and more particularly relates to accurately estimating the sizes of intermediate query results for use in query optimization.

2. Description of the Related Art

Business Intelligence or On-line Analytical Processing (OLAP) applications are often carried out on data stored in data warehouses. These involve complex queries and very large databases, and the optimization of query access plans improves the efficiency of these database systems.

Star schema is perhaps the most commonly used model for databases in data warehouses. At the center of a star schema is typically a very large fact table containing the individual facts which constitute the primary information being stored in a database. Queries of the database often join the fact table to a number of much smaller dimension tables through primary-key/foreign-key relationships. The fact table typically has many millions of rows, while the dimension tables may have several hundred rows. Each of the dimension tables contains detail information about a particular attribute in the fact table.

The task of transforming a declarative query into a physical query execution plan (QEP) in a database system is usually left to a query optimizer. The query optimizer chooses an optimal plan based on cost estimates of various candidate plans. Accurate estimation of the sizes of intermediate query results, or cardinality estimation, is needed for accurate plan costing in query optimization. The common practice in current commercial database systems is to derive the cardinality estimates from base-table statistics. However, this approach often suffers from simplifying unrealistic assumptions that have to be made about the underlying data, such as when different attribute values are independently distributed.

There have been proposals for exploiting statistics on query expressions to improve the accuracy of cardinality estimation. One way to compute such statistics is for the views that represent intermediate results of join instructions to be fully materialized or generated and statistics collected on the materialized view. A major drawback of this method is its high computation cost, particularly when tables are large and joins are involved. Because generating the materialized view requires a full execution of the query expression, the computation can be very expensive. Although this cost can potentially be amortized over many queries whose optimization can utilize the statistical view, in cases where the underlying data is updated frequently, the cost of re-computing the view and then updating the statistics can be prohibitive.

Furthermore, the statistical views are often defined without any specific query in mind. Therefore, the set of statistical views must be carefully selected to ensure their value with regard to the optimization of prospective queries.

As an example, in a data warehouse scenario, traditional estimation techniques used to compute the intermediate results between a fact table and a dimension table could be significantly inaccurate when there is skew in the values in the join column of the fact table or significant difference in the values in the dimension table join column compared to the fact table join column. Thus, a need exists for improving query optimization within a database management system by accurately estimating the sizes of intermediate query results for joins between the fact table and the dimension table. One way to solve this is to make use of a predefined statistical view that has the relevant statistics collected periodically. Another way is to have an appropriate statistical view dynamically generated on-the-fly during query optimization and have the statistics collected. In both these situations, there is a need to collect the statistics very quickly. For the on-the-fly generated statistical view, the need for fast computation of the statistics facilitates minimizing the cost of executing the query.

SUMMARY OF THE INVENTION

Given the foregoing discussion, Applicant asserts that a need exists for an apparatus, system, and method that perform fast approximate computation of statistics on query expressions. Beneficially, such an apparatus, system, and method would allow for faster generation of statistical views and faster query optimization.

The present invention has been developed in response to the present state of the art, and in particular, in response to the problems and needs in the art that have not yet been fully solved by currently available database management systems. Accordingly, the present invention has been developed to provide an apparatus, system, and method for performing fast approximate computation of statistics on query expressions, and in particular on joins within query expressions, that overcomes many or all of the above-discussed shortcomings in the art.

The apparatus to perform fast approximate computation of statistics on query expressions is provided with a plurality of modules configured to functionally execute the necessary steps of accurately estimating the sizes of intermediate query results. These modules in the described embodiments include a query analysis module, an identification module, a statistics retrieval module, an estimation module, a population module, and an output module.

The query analysis module is configured to analyze a query expression for join instructions. The identification module is configured to identify a fact table and a dimension table from the join instructions. In one embodiment, the identification module may utilize the relative sizes of the fact table and the dimension table to determine which table is which.

The statistics retrieval module is configured to retrieve frequency statistics from a catalog table, the frequency statistics corresponding to distinct values within a join column of the fact table and to output a generated frequency statistics table.

The estimation module is configured to estimate frequency statistics corresponding to each column of a join result between the fact table and the dimension table by generating a statistical view comprising a join of the generated frequency statistics table derived from fact table and the dimension table by using the generated frequency statistics table to simulate the fact table.

The population module is configured to populate the statistical view with the estimated frequency statistics. The output module is configured to send or make available the estimated frequency statistics to a query optimizer. In one embodiment, frequency statistics may be estimated for common join instructions received by a database management system, and the estimated frequency statistics may be available to the database management system via a look-up table or the system catalog for later usage.

A method of the present invention is also presented for autonomically analyzing a database management system. The method in the disclosed embodiments substantially includes the steps necessary to carry out the functions presented above with respect to the operation of the described apparatus and system.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
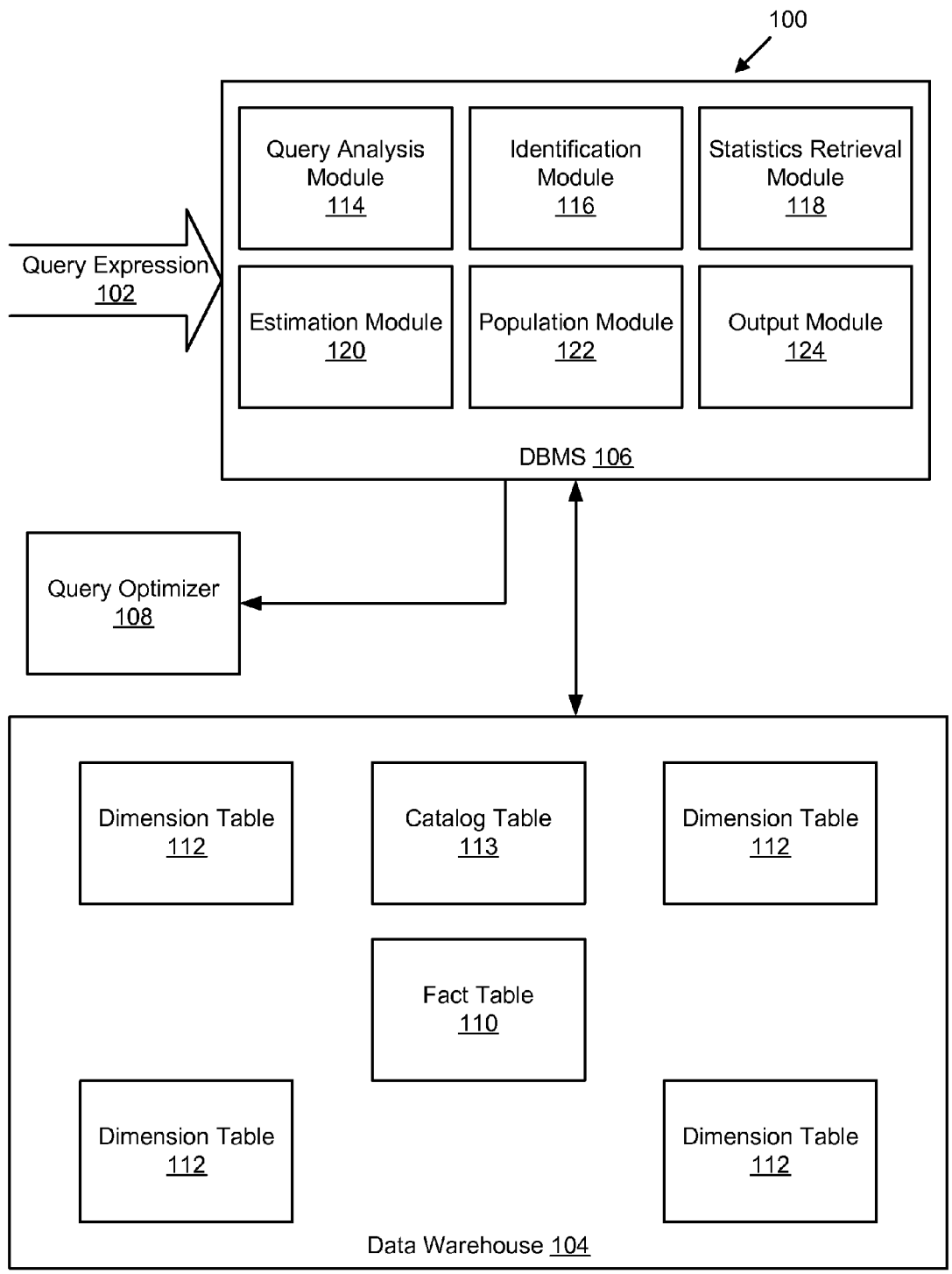
FIG. 1 is a schematic block diagram illustrating one embodiment of a system to perform fast approximate computation of statistics on query expressions in accordance with the present invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a signal bearing medium may take any form capable of causing execution of a program of machine-readable instructions on a digital processing apparatus. A signal bearing medium may be embodied by a compact disk, digital-video disk, a magnetic tape, a Bernoulli drive, a magnetic disk, a punch card, flash memory, integrated circuits, or other digital processing apparatus memory device.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

FIG. 1 depicts a system 100 for performing fast approximate computation of statistics on query expressions. The system includes a query expression 102, a data warehouse 104, a DBMS (database management system) 106, and a query optimizer 108.

The query expression 102 is typically a database command that may comprise various operations to be performed by the DBMS 106 as will be recognized by one skilled in the art. In various embodiments, the query expression 102 may include a combination of database commands such as SELECT, SUM, or GROUP BY which are typically expressed using a database language such as SQL (Structured Query Language). In accordance with the present invention, the query expression 102 may include a command that requires a join between two different sets of data. A join is a database operation that combines records from two or more tables in a relational database. One embodiment of the present invention is directed toward accurately estimating the sizes of the resultant joins between two tables in a database without having to perform the complete join operation.

The data warehouse 104 is a computer system for archiving and analyzing an organization's historical data, such as sales, salaries, or other information from day-to-day operations. In one embodiment, information may be copied from operational systems to the data warehouse 104 such that complex queries and analysis may be performed on the information without slowing down the operational systems. In a common embodiment, a star schema is utilized as the organizational structure for the data warehouse 104. However, other organization types may also be utilized with the present invention as will be recognized by one skilled in the art. A star schema typically includes a single fact table 110 related to numerous dimension tables 112. The fact table 110 may include a foreign key which references each of the various dimension tables 112, and the dimension tables 112 may include a corresponding primary key for referencing the fact table 110. Each of the tables may also include numerous columns of data.

The columns within the fact table 110 and dimension tables 112 on which a join occurs are typically referred to as join columns. For example, a fact table 110 may contain a history of transactions with one column containing a user name. A dimension table 112 that contains a list of users may also include a column containing user names with other columns including such information as address or telephone number. Thus, if the fact table 110 and the dimension table 112 were joined based on user name, then the columns which contain the user names may be referred to as join columns.

The data warehouse 104 may also include a catalog table 113. The catalog table 113 contains statistics on the information stored within the data warehouse 104. For example, because the fact table 110 is usually very large, the catalog table 113 typically includes frequency statistics corresponding to the number of occurrences of each unique value contained in a particular column of the fact table 110. Thus, frequency statistics representative of the fact table 110 may be retrieved from the catalog table 113 without performing a complete scan of the actual fact table 110.

With regard to the present invention, a query expression 102 may require a join between a fact table 110 and a dimension table 112. The present invention quickly approximates statistics which accurately describe a resultant join between a fact table 110 and a dimension table 112 by utilizing frequency statistics stored in the catalog table 113.

The DBMS (Database Management System) 106 includes a query analysis module 114, an identification module 116, a statistics retrieval module 118, an estimation module 120, a population module 122, and an output module 124. A DBMS is a system or software designed to manage a database and run operations or query expressions 102 by numerous clients. Typical examples of DBMS uses include accounting, human resources, and customer support systems. Although the various modules 114-124 relative to the present invention are shown within the DBMS 106, in other embodiments, the modules may be implemented outside of a DBMS 106.

In accordance with the present invention, the query analysis module 114 analyzes a query expression 102 for join instructions. Thus, the query analysis module 114 receives a query expression 102 and determines whether or not it includes a join operation. For example, a join may be required between a fact table 110 that contains a history of transactions and a dimension table 112 that contains a list of users that have completed transactions. If it is determined that the query expression 102 includes a join operation between two tables, then the identification module identifies a fact table 110 and dimension table 112 from the join instructions. In one embodiment, this may include comparing the relative sizes of each of the tables to determine which is larger. Typically, a fact table 110 is much larger than a dimension table 112.

The statistics retrieval module 118 retrieves frequency statistics from a catalog table 113 corresponding to distinct values within one or more join columns of the fact table 110. Because a fact table 110 is usually very large, the data warehouse 104 includes a catalog table 113 comprised of statistics which describe the fact table 110. In one embodiment, the catalog table 113 includes the frequency with which each unique value occurs in a particular column of the fact table 110. Thus, rather than scanning the entire fact table 110, the statistics retrieval module 118 retrieves frequency statistics from the catalog table 113.

Then, the statistics retrieval module 118 generates a frequency statistics table comprising the frequency statistics retrieved from the catalog table 113. The frequency statistics table may then be utilized to simulate the much larger fact table 110 when estimating statistics on a resultant join between the fact table 110 and a dimension table 112.

The estimation module 120 estimates frequency statistics corresponding to each column of a join result between the fact table 110 and the dimension table 112 by generating a statistical view comprising a join of the generated frequency statistics table and the dimension table 112 by using the generated frequency statistics table to simulate the fact table 110. In order to accurately represent the resultant join between the fact table 110 and the dimension table 112, the join of the frequency statistics table and the dimension table 112 may be expanded in accordance with the frequency statistics contained in the frequency statistics table by appropriate multiplication.

For example, if the frequency statistics show that a unique value occurred in the fact table 250 times, then the join between the frequency statistics table and the dimension table 112 may theoretically be expanded to include 250 rows as exists in the actual fact table 110. It should be noted that although the fact table 110 is not closely examined, the dimension table 112 is closely examined which allows the capture of the correlations between the attributes in the dimension table 112 as well as the skew and domain range of the fact table 110 join column values. However, because of the relatively small size of the dimension tables 112, close examination does not have a substantially adverse effect on the speed of the computation. In this manner, the present invention utilizes the frequency statistics on the join column of the fact table 110, along with a full scan of the dimension table 112, to obtain approximate statistics on the columns of the resultant join between the fact table 110 and the dimension table 112.

By way of further example, suppose there is a dimension table D with columns (pk, d1, d2, . . . , dm) where pk is the primary key, and suppose there is a fact table F 110 with columns (fk, c1, c2, ..., cn) where fk is a foreign key referencing D.pk (thus, all of the values in the column F.fk appear in the column D.pk). And suppose they join on D.pk F.fk (or where the join columns share equal values) and the join result is denoted as S. The information of interest regarding query optimization is the frequency statistics on all or a subset of the columns (d1, d2, ..., dm) in S. Now, denote the values in the column F.fk by (v1, ..., vp), and their corresponding frequencies (number of occurrences of these values by (f1, ..., fp). Suppose a user is interested in obtaining the frequency statistics of column S.x (x $\in$ {d1, ..., dm}). Now denote the values in this column by (u1, u2, ..., uq). Let the number of tuples satisfying the condition "D.pk=vi and D.x=uj" be sij. By the definition of join, the frequency of uj in column S.x is therefore $\Sigma_i$ sij. Clearly, for obtiaining the results for all uj ($1 \leq j \leq q$), all that is needed is the frequency statistics on F.fk, and one scan of table D to obtain the sij's needed to compute the frequency statistics of the resultant join.

In one embodiment, the estimation module 120 estimates frequency statistics for common join instructions received by the DBMS 106 and makes those frequency statistics available to the DBMS 106 via a look-up table, the system catalog, or other method recognized by those of skill in the art. Thus, frequently used frequency statistics estimates may not need to be re-computed until there is significant change in the underlying fact table or dimension table, thereby further improving the efficiency of a query optimizer 108. A threshold number of data value changes may identify whether a significant change in the underlying fact table or dimension table has occurred.

The population module 122 populates the generated statistical view with the estimated frequency statistics so as to make the estimated frequency statistics available to a user or to a query optimizer 108. The output module 124, in one embodiment, sends or makes available the estimated frequency statistics to a cost based query optimizer 108 so that the query optimizer can determine the most efficient query expressions 102.

The query optimizer is the component of a DBMS 106 that attempts to determine the most efficient way to execute a query expression 102. The query optimizer 108 considers different possible query plans for a given input query, and attempts to determine which of those plans will be the most efficient. Cost-based query optimizers 108 assign an estimated "cost" to each possible query plan, and choose the plan with the least cost. The estimated frequency statistics produced by the present invention are used by the query optimizer 108 to make these determinations. However, the present invention may also be utilized in various embodiments as an independent tool outside a DBMS 106 for an already created statistical view or within a database system to dynamically compute the statistics on possibly adhoc statistical views created during the database optimization process itself.

Figure 2:
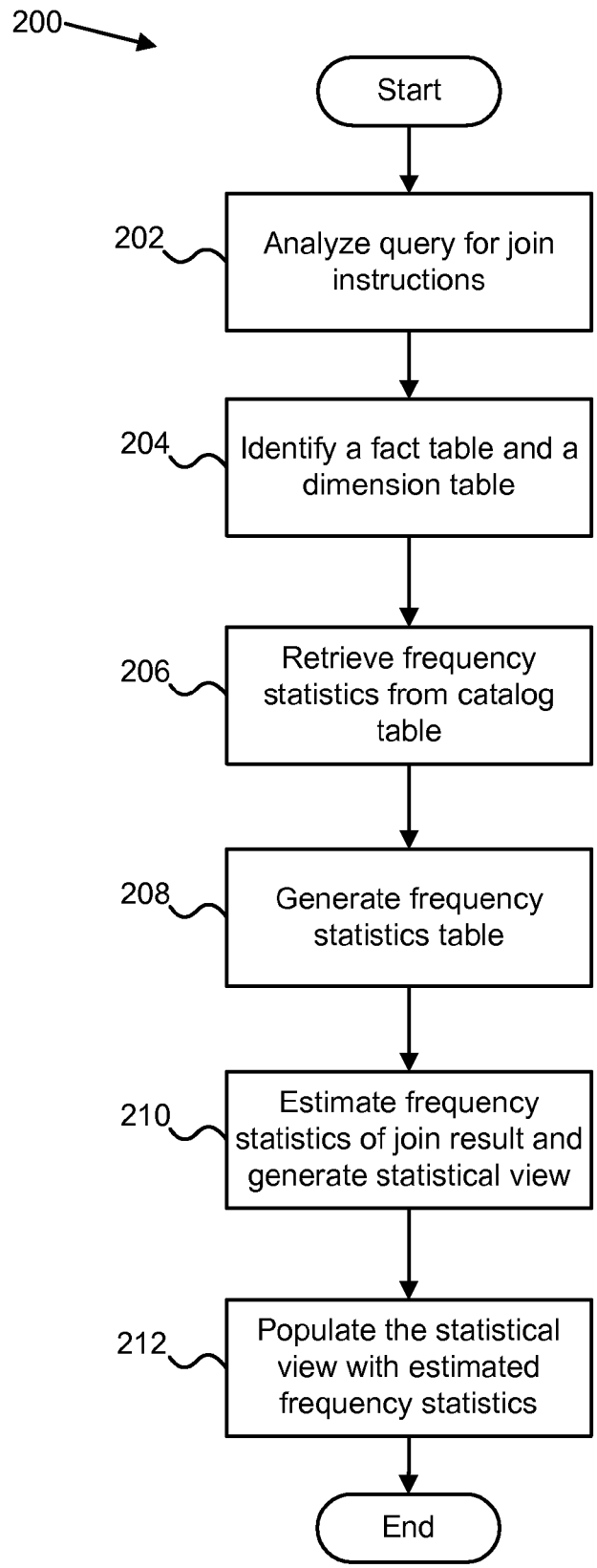
FIG. 2 is a schematic flow chart diagram illustrating one embodiment of a method for performing fast approximate computation of statistics on query expressions in accordance with the present invention.

FIG. 2 is a schematic flow chart diagram illustrating one embodiment of a method 200 for fast approximate computation of statistics on query expressions 102 in accordance with the present invention. The method 200 includes substantially the same modules described above with regard to FIG. 1.

The method 200 begins when the query analysis module 114 analyzes 202 a query for join instructions. Then, the identification module 116 identifies 204 a fact table 110 and a dimension table 112 from the join instructions based on the size of the tables or other identifying attributes. Next, the statistics retrieval module 118 retrieves 206 frequency statistics from a catalog table 113 corresponding to distinct values of one or more join columns of the fact table 110 and generates 208 a frequency statistics table comprised of the retrieved frequency statistics.

The estimation module 120 estimates 210 frequency statistics corresponding to each column of a join result between the fact table and the dimension table by using the generated frequency statistics table to simulate the fact table 110. An accurate representation of frequency statistics of an expected join between the fact table 110 and a dimension table 112 can be made from the frequency statistics table and a scan of the dimension table 112. These estimated frequency statistics are then used to populate 212 the generated statistical view. In one embodiment, the output module 124 may send the estimated frequency statistics to a cost based query optimizer 108 for use in query optimization. In another embodiment, the output module 124 may populate a statistical view such that the estimated frequency statistics can be used later by the cost based query optimizer 108. The method 200 ends.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer program product comprising a computer readable storage medium having computer usable program code programmed to perform fast approximate computation of statistics on query expressions within a database management system (DBMS) by accurately estimating the sizes of intermediate query results based on frequency statistics, the operations of the computer program product comprising:
   analyzing a query expression for join instructions;
   identifying a fact table and a dimension table from the join instructions;
   retrieving frequency statistics from a catalog table corresponding to distinct values within one or more join columns of the fact table;
   generating a frequency statistics table comprising the frequency statistics for each column of the fact table included in the join instructions, the frequency statistics retrieved from the catalog table, the frequency statistics table comprising a column for each join column of the fact table and a row for each distinct value in the one or more join columns;
   estimating frequency statistics corresponding to each column of a join result between the fact table and the dimension table by generating a statistical view comprising a join of the generated frequency statistics table and the dimension table, the generated statistical view comprising a table structure formed by joining the generated frequency statistics table with the dimension table instead of joining the fact table with the dimension table and populating the statistical view with the estimated frequency statistics.

2. The computer program product of claim 1, the operations further comprising sending the estimated frequency statistics to a cost based query optimizer.

3. The computer program product of claim 1, wherein the fact table is distinguished from the dimension table based on the relative size of each table.

4. The computer program product of claim 1, wherein frequency statistics are estimated for common join instructions received by a database management system and wherein the estimated frequency statistics are available to the database management system via a system catalog.

5. An apparatus to perform fast approximate computation of statistics on database query expressions by accurately estimating the sizes of intermediate query results based on frequency statistics, the apparatus comprising:

a query analysis module configured to analyze a query expression for join instructions;

an identification module configured to identify a fact table and a dimension table from the join instructions and from the relative sizes of the fact table and the dimension table;

a statistics retrieval module configured to retrieve frequency statistics for each column of the fact table included in the join instructions, the frequency statistics retrieved from a catalog table, the frequency statistics corresponding to distinct values within a join column of the fact table, the frequency statistics organized as a frequency statistics table comprising a column for each join column of the fact table and a row for each distinct value in the one or more join columns;

an estimation module configured to estimate frequency statistics corresponding to each column of a join result between the fact table and the dimension table by generating a statistical view comprising a join of the generated frequency statistics table and the dimension table, the generated statistical view comprising a table structure formed by joining the generated frequency statistics table with the dimension table instead of joining the fact table with the dimension table;

a population module configured to populate the statistical view with the estimated frequency statistics;

an output module configured to make available the estimated frequency statistics to a query optimizer; and wherein the query analysis module, identification module, statistics retrieval module, estimation module, population module, and output module comprise one or more of logic hardware comprising a processor and memory and executable code, the executable code stored on a computer readable storage medium.

6. The apparatus of claim 5, wherein frequency statistics are estimated for common join instructions received by a database management system and wherein the estimated frequency statistics for the common join instructions are available to the database management system via a system catalog.

* * * * *